US006252693B1

(12) United States Patent
Blauvelt

(10) Patent No.: US 6,252,693 B1
(45) Date of Patent: *Jun. 26, 2001

(54) APPARATUS AND METHOD FOR REDUCING IMPAIRMENTS FROM NONLINEAR FIBER EFFECTS IN 1550 NANOMETER EXTERNAL MODULATION LINKS

(75) Inventor: Henry A. Blauvelt, San Marino, CA (US)

(73) Assignee: Ortel Corporation, Alhambra, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,947

(22) Filed: Dec. 21, 1999

Related U.S. Application Data

(60) Provisional application No. 60/135,319, filed on May 20, 1999.

(51) Int. Cl.[7] .................................................. H04B 10/04
(52) U.S. Cl. ...................... 359/183; 359/180; 359/181; 359/161; 359/189
(58) Field of Search .................................. 359/180, 181, 359/183, 161, 189

(56) References Cited

U.S. PATENT DOCUMENTS

| | | | |
|---|---|---|---|
| 4,560,246 | 12/1985 | Cotter | 350/96.16 |
| 5,166,821 | 11/1992 | Huber | 359/238 |
| 5,315,426 | 5/1994 | Aoki | 359/180 |
| 5,359,450 | 10/1994 | Ramachandran et al. | 359/188 |
| 5,373,385 | 12/1994 | Darcie et al. | 359/162 |
| 5,420,868 | * 5/1995 | Chraplyvy et al. | 370/122 |
| 5,548,436 | 8/1996 | Ramachandran et al. | 359/187 |
| 5,566,381 | * 10/1996 | Korotky | 359/183 |
| 5,737,109 | * 4/1998 | Goodwin | 359/161 |
| 5,828,477 | * 10/1998 | Nilsson et al. | 359/181 |
| 5,892,607 | * 4/1999 | Atlas | 359/183 |
| 5,930,024 | 7/1999 | Atlas | 359/279 |
| 5,991,061 | * 11/1999 | Adams et al. | 359/188 |

OTHER PUBLICATIONS

Yamamoto, Y., et al, "Coherent Optical Fiber Transmission Systems," IEEE Journal of Quantum Electronics, Jun. 1981, pp. 919–935, vol. QE–17, No. 6, IEEE USA.

* cited by examiner

*Primary Examiner*—Leslie Pascal
*Assistant Examiner*—Hanh Phan
(74) *Attorney, Agent, or Firm*—Christie, Parker & Hale, LLP

(57) ABSTRACT

Nonlinear optical effects, such as stimulated Brillouin scattering, limit the power density of an optical signal that can be launched into an optical fiber. The SBS threshold is increased by a triple frequency modulation scheme, wherein an optical source is modulated by a low frequency sinusoid, e.g., 10–100 kHz, as well as an amplitude modulated high frequency signal, e.g. 6 GHz. In addition, the optical beam is externally phase modulated at a frequency which is not less than twice the frequency of the highest signal frequency being transmitted by the fiber, e.g. 2 GHz for a CATV transmission.

39 Claims, 6 Drawing Sheets

APPARATUS AND METHOD FOR REDUCING IMPAIRMENTS FROM NONLINEAR FIBER EFFECTS IN 1550 NANOMETER EXTERNAL MODULATION LINKS

CROSS-REFERENCE TO RELATED APPLICATION

This application claims the benefit of U.S. Provisional Patent Application No. 60/135,319, filed May 20, 1999, the contents of which are hereby incorporated by reference.

FIELD OF THE INVENTION

This application relates generally to optical transmission systems and more particularly to methods and apparatus for reducing impairments from nonlinear effects in optical fibers when transmitting broadband, high power optical signals over extended distances.

BACKGROUND

Optical transmission systems employ electromagnetic waves from a spectrum of wavelengths including but not limited to the visible spectrum, and often including infrared. It is to be understood that here, expressions such as light, optical and related terms are not to be restricted to the visible spectrum. In optical communication systems a light beam is modulated in accordance with information to be conveyed, and transmitted along dielectric waveguides to a receiver. Typically, transmission of broadband signal content, such as analog multichannel video, requires the use of narrow linewidth light sources, in conjunction with low loss, single mode optical fibers. A typical transmitter for CATV operates at a wavelength of 1550 nm, and includes a narrow linewidth, continuous wave Distributed FeedBack (DFB) laser and an external modulator.

Optical transmission at 1550 nm has two important advantages. First, the attenuation of standard, single mode optical fiber is at a minimum near 1550 nm. Second, efficient Erbium Doped Fiber Amplifiers (EDFAs) also operate in the 1550 nm wavelength region. EDFAs provide saturated output powers exceeding 20 dBm with minimal distortion when amplifying linear fiber optic signals. By using EDFAs to boost the signal power, the range of the fiber optic links can be greatly extended.

However, there is limited noise introduced onto the signal by each amplifier. To avoid degrading the carrier to noise ratio (CNR), it is desirable to design the system fiber links so as to ensure a high input power to each downstream EDFA. Also, it is desirable to minimize the total number of EDFAs installed in links which require multiple EDFAs. Together, these system design constraints require the launching of high power optical signals into each segment of the fiber optic link.

As is well known in the art, nonlinear optical effects, due to the interaction of the local electric field across the fiber and the fiber material, restrict the optical power that can be launched into a single mode optical fiber. These non-linear effects also depend on the length of the fiber, with a cumulative degradation of performance resulting as the length of the fiber increases. The two most significant nonlinear fiber effects exhibited in silica fibers at high power levels are Self Phase Modulation (SPM) and Stimulated Brillouin Scattering (SBS).

The index of refraction of glass is altered in the presence of signals with high optical power densities. This results in the phenomenon known as Self Phase Modulation wherein the index of refraction of an optical fiber is modulated at frequencies where the optical carrier is amplitude modulated. Thus, when a high power optical signal is launched into an optical fiber, the signal acquires optical phase modulation at all frequencies for which amplitude modulation of the optical signal is present. Depending on the transmission distance and maximum frequency being transmitted, this limits the maximum launch power. For example, for a transmission distance of 65 km, at a maximum frequency of 750 MHz, and a Cumulative Second Order Distortion (CSO) specification of −65 dBc, the maximum launch power would be limited to about +13 dBm (20 mW), unless a compensation technique for SPM is used.

Stimulated Brillouin Scattering (SBS) occurs when a narrow linewidth optical beam is launched into a low loss optical fiber above a threshold power level. High optical power densities generate acoustic phonons in optical fiber. This results in SBS wherein the phonons produced by a high power optical signal can reflect that signal, resulting in increased attenuation and noise on the optical signal. The amplitude of the reflected energy increases rapidly if the optical power exceeds the SBS threshold. For standard single mode fiber, the SBS threshold is in the range of 6–7 dBm (4–5 mW). SBS can also be characterized by an optical linewidth. For standard single mode fiber, the SBS linewidth is in the range of 20–30 MHz. It is the amplitude of the optical signals within the SBS linewidth that determines the amount of optical scattering.

A conventional approach to increasing the SBS threshold is to spread the transmitted optical power over a wide range of optical wavelengths. As long as the power within the SBS linewidth does not exceed the threshold, SBS will remain adequately suppressed to avoid signal impairments. Prior art attempts to suppress SBS typically have involved the optical broadening of the linewidth of the output of the optical source, either through external phase or frequency modulation. Such approaches, while increasing the SBS threshold, do not adequately address second order non linear effects due to self phase modulation.

For example, the refractive index of optical fiber varies with wavelength so that different wavelengths of light travel at different velocities down a fiber. This effect, known as dispersion, spreads the transmitted signal energy in time. The majority of presently installed fiber links, use fiber with a zero dispersion wavelength near 1310 nm. Thus, at 1310 nm where dispersion is not an issue, the SBS threshold can be increased simply by using an optical source whose linewidth, without modulation, is large compared to the SBS linewidth of the fiber. However, the dispersion at 1550 nm, at about 17 psec/nm-km, is quite high. Therefore, to avoid the negative implications of dispersion, typical external modulation links operating at 1550 nm, utilize continuous wave DFB lasers with optical linewidths less than the SBS linewidth of typical signal mode fiber. Thus, unless some method is used to spread the signal linewidth, the maximum optical power that can be launched is about 6–7 dBm.

Dispersion also creates several complications when an optical source is phase or frequency modulated to broaden its linewidth. For the purpose of this discussion, the terms phase modulation and frequency modulation can be used interchangeably. The amount of frequency modulation is simply the time derivative of the phase modulation. For example, when an optical signal is frequency modulated, or chirped, at a frequency $f_{mod}$, the resulting optical spectrum consists of the original optical carrier frequency plus sidebands spaced at multiples of $f_{mod}$ above and below the original optical carrier frequency. That is, an electrical signal at frequency $f_1$ will have sidebands at $f_1 \pm f_{mod}$. To avoid sideband interference with the transmission of a multichannel signal, no sideband of one carrier can fall on another carrier frequency. Effectively, this means that the modulation frequency must be at least twice the maximum frequency in the multichannel transmission band.

Thus, for a link transmitting an optical signal with a maximum frequency of 860 MHz, the minimum frequency for the optical frequency modulation is 1720 MHz. This constraint applies for both direct modulation of a source laser as well as external modulation of the output of the laser with an electrooptic phase modulator.

An additional important consideration when using optical spreading to avoid SBS is a reduction in the transmission bandwidth as a result of dispersion. Because of dispersion, the different spectral components of the transmitted signal propagate at different velocities. When the difference in the propagation delays for the maximum and minimum optical frequencies becomes comparable to the period of the highest RF frequency being transmitted, the response at the higher RF frequencies will be significantly suppressed. Thus, the overall spectral width must be maintained below the value that results in frequency roll-off. For standard 1310 nm zero dispersion fiber, the tolerable spectral width is inversely dependent on the maximum frequency being transmitted and the fiber length. For a 150 km link operating up to 860 MHz, the maximum spectral width is about 0.2 nm or 25 GHz.

Also, due to small fluctuations in the index of refraction of silica fiber, light is scattered at low power levels and propagates in the fiber. A portion of this light is scattered in such a way as to propagate backwards in the fiber towards the transmitter. Similarly, a portion of this light is in turn scattered a second time from the transmitter back towards the receiver. The power level of the double reflected scattered light at the receiver is relatively low, but is nonetheless sufficient to represent a significant source of noise, referred to as Interferometric Intensity Noise (IIN) . Interferometric noise will be present at any frequency that corresponds to the difference between any two optical frequencies that are present in the optical signal.

It is important that the IIN not fall within the main information band, which is typically 50–860 MHz for multichannel video transmission. Thus, the optical spectrum is preferably broken into bands that are no more than 50 MHz wide in which the bands are separated by at least 860 MHz.

More recently, efforts to suppress SBS have combined high frequency modulation of the drive current of a DFB laser with externally imposed phase modulation of the DFB laser output. A primary disadvantage of these systems is signal distortion caused by Self Phase Modulation (SPM). The direct modulation of the drive current of the laser produces both amplitude and phase modulation. Since the main transmission signal has amplitude modulation, there will be distortion of the main signal due to SPM. Prior art modulation schemes do not address or compensate for this distortion.

The system solution of fiber optic transmission at 1550 nm with EDFAs to boost the signal power is the preferred design for long distance transmission of linear fiber optic signals. Prior art approaches do not adequately address the practical limitations of reducing the non linear effects in optical fiber for the transmission of such a signal. Therefore, it would be advantageous to provide a method and an apparatus to minimize the adverse consequences of fiber non linear effects.

SUMMARY OF THE INVENTION

There is, therefore, provided according to a presently preferred embodiment, a method and apparatus for reducing non linear effects in an optical fiber used for communicating broadband, high power optical signals. The present invention utilizes a triple frequency modulation technique to realize an increase in the SBS threshold without inducing unacceptable degradations in the quality of the transmitted signal. In addition, a narrow overall spectral width is maintained, to minimize carrier roll-off due to fiber dispersion.

In a preferred embodiment, a low frequency signal, in the range of about 10–100 kHz, is combined with the DC bias of a light source to drive the bias input of the light source. In addition, an external phase modulator is coupled to the output of the light source. An intermediate frequency signal, that is at least twice the maximum frequency of the information signal being transmitted drives the external phase modulator. A high frequency signal drives the RF port of the light source at a frequency that is approximately three times the frequency of the intermediate frequency signal.

Alternatively, the intermediate frequency signal that drives the external phase modulator is subject to frequency excursions or frequency modulation. The frequency modulation occurs over a narrow frequency range of less than about 1 MHz. Advantageously, modulating the frequency of the external phase modulator reduces the level of intermodulation distortion products related to the phase modulation signal.

Alternatively, the wavelength of the light source (e.g., a semiconductor laser) is modulated at a low frequency of around 10–100 kHz to broaden the optical spectrum to a width that is approximately equal to the lowest signal frequency being transmitted, typically 40–50 MHz, so as to avoid the detrimental impacts of IIN. This wavelength modulation results in a double peaked optical spectrum.

In addition, a high frequency signal at approximately 6 GHz and an intermediate frequency signal at approximately 2 GHz, provide narrowband phase modulation of the optical signal. The lower of these two frequencies is preferably at least twice the maximum signal frequency being transmitted to avoid signal degradation due to fiber dispersion. For CATV transmission, the maximum signal frequency is approximately 850 MHz and a 2 GHz signal externally modulates the output of the light source. The FM index for the 2 GHz modulation is preferably about 1.4, or 3.3 or 5.0.

The 6 GHz signal undergoes amplitude modulation prior to being injected into the RF port of the light source. This modulation provides amplitude and phase modulation, which further raises the SBS threshold for launching at higher power levels. The 6 GHz FM Index is preferably in the range of 1.4 to 2.5 and is adjusted in such a way as to provide an SBS threshold above the maximum launch power and to have optimum CSO.

Alternatively, a low frequency signal, in the range of about 10–100 kHz, is combined with the DC bias of a light source to drive the bias input of the light source. In addition, a high frequency signal is divided so that a first portion of the high frequency signal drives the RF port of the light source. This embodiment further includes an external phase modulator coupled to the output of the light source. An intermediate frequency signal, at a frequency that is at least twice the maximum frequency of the information signal being transmitted, is conventionally combined with the second portion of the high frequency signal, such that the combined signals drive the external phase modulator. The high frequency signal is at a frequency that is approximately three times the frequency of the intermediate frequency signal.

These and other aspects of the present invention will be more readily understood when considered in connection with the drawings and the following detailed description.

DETAILED DESCRIPTION

In accordance with the present invention, non linear effects exhibited in an optical fiber when launching a spread spectrum, high power signal, such as multi-channel CATV, are reduced or eliminated. High power optical communication systems are advantageous in that signals can be transmitted over greater distances without the need for amplification. This reduces the overall cost of the transmission system. The present invention increases the effective linewidth of the light source, facilitating the transmission of signals with increased optical power, without creating signal degradations from second order non linear effects.

The present invention uses a triple phase/frequency modulation technique to suppress SBS and also to provide compensation of second order distortion due to Self Phase Modulation (SPM). The technique involves both direct and external modulation, as well as phase and amplitude modulation of the optical beam and wavelength modulation of the laser.

Figure 1:
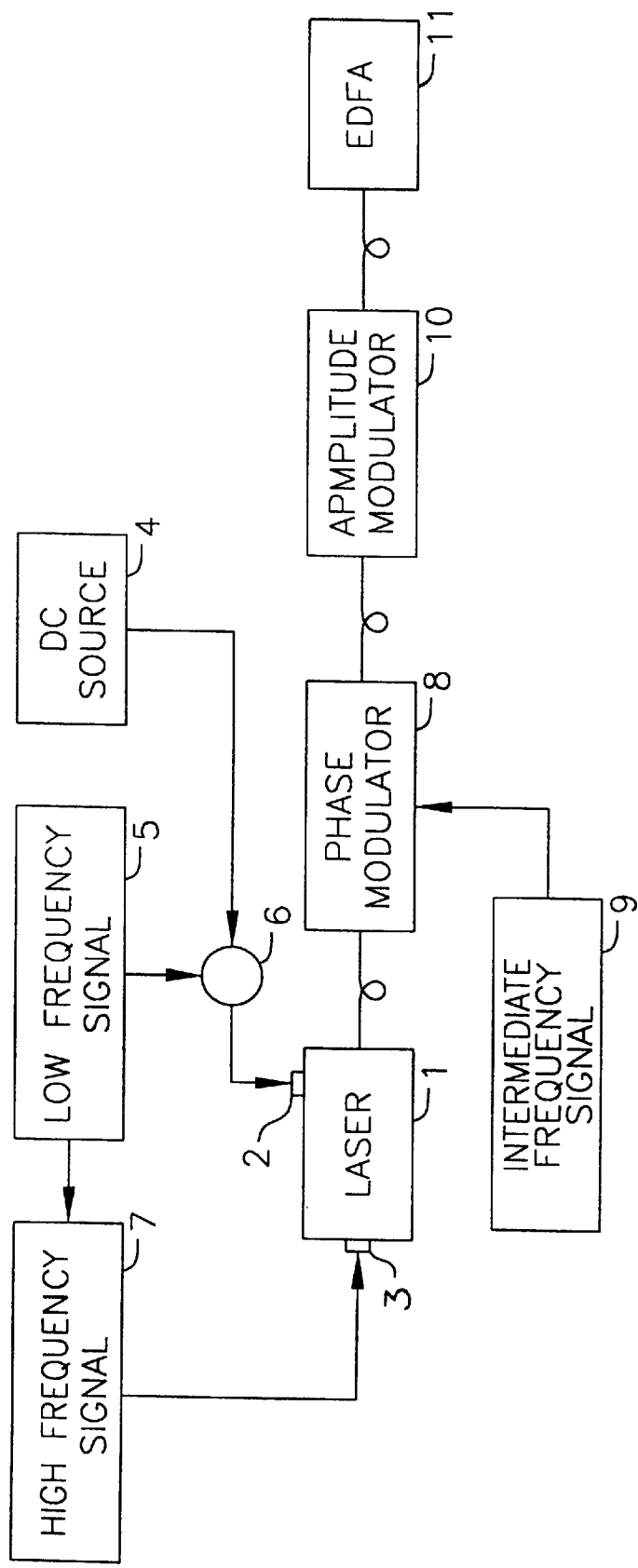
FIG. 1 Is a schematic block diagram of a preferred embodiment of optical transmission system demonstrating the triple phase modulation approach to suppression of SBS.

FIG. 1 shows a schematic block diagram of a presently preferred embodiment of optical transmission system. A direct current source 4 drives a commercially available DFB laser 1. As is known in the art, the laser has a bias input port 2 and an RF input port 3. A first low frequency signal 5 (preferably, a sinusoidal signal in a frequency range from about 10–100 kHz) modulates the direct current source which drives the bias port of the laser. The magnitude of the low frequency signal is preferably chosen so that the effective spectral linewidth of the laser is broadened so as to be approximately equal to the lowest signal frequency being transmitted, typically about 40–50 MHz for CATV. The low frequency signal is conventionally combined, as is known in the art, with the direct current source in a bias tee 6.

Figure 2:
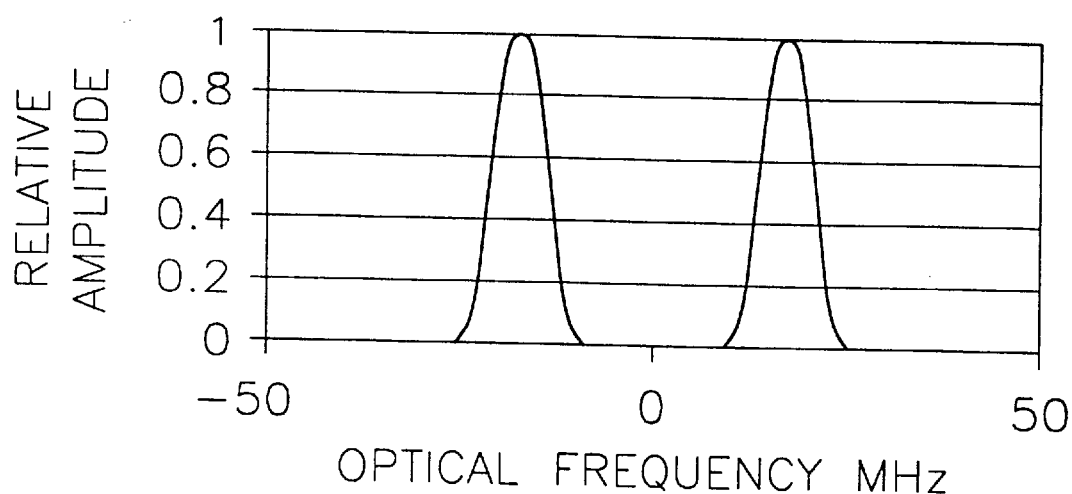
FIG. 2 is a graphical representation of the approximate amplitude of the optical spectrum when an alternating series of positive and negative current pulses with zero transition time are used to drive a laser.
Figure 3:
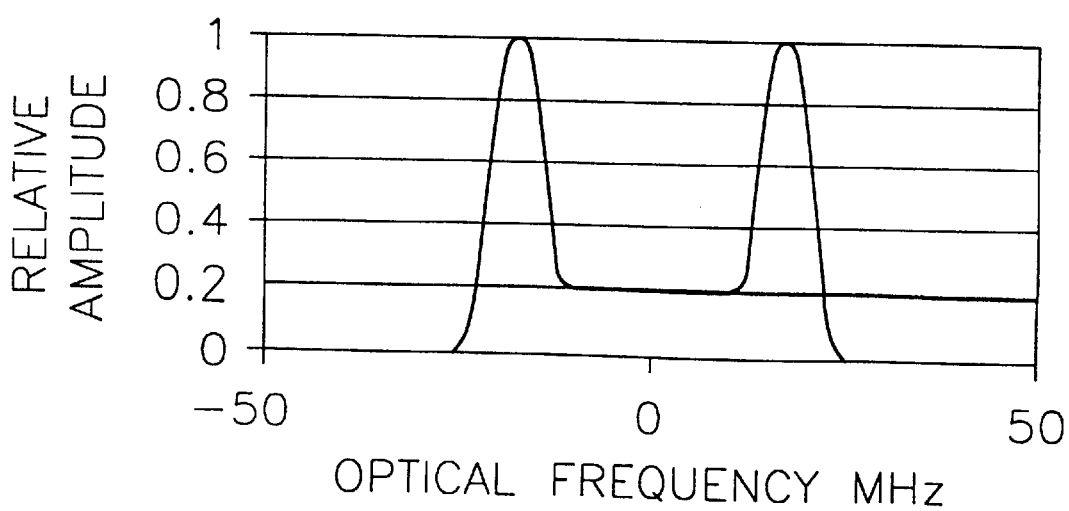
FIG. 3 is a graphical representation of the approximate amplitude of the optical spectrum when the laser drive current has a non zero transition between positive and negative inputs.
Figure 4:
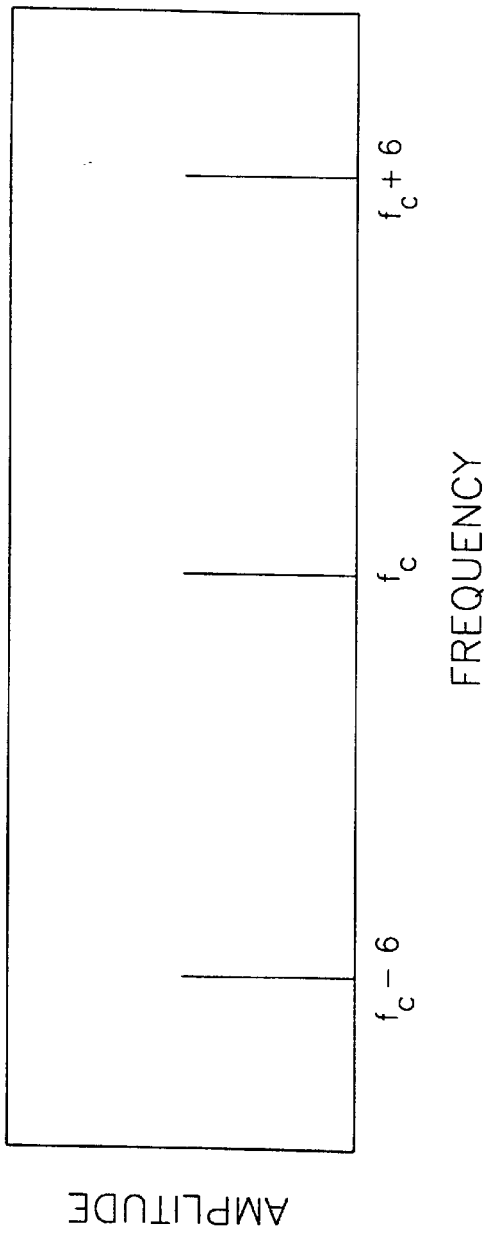
FIG. 4 is a graphical representation of the frequency spectrum of a laser that has been phase modulated at a frequency of 6 GHz with a FM index of 1.5.

In addition, a second, high frequency signal 7 (at a frequency of about 6 GHz), that is amplitude modulated at a rate in the range of about 10–100 kHz, drives the RF input port 3 of the laser 1. The low frequency signal 5 modulates the bias voltage of an output amplifier (not shown) transmitting the high frequency signal so as to effect the amplitude modulation. The high frequency signal thermally modulates the transmitted wavelength of the laser. The combined effects of the low frequency signal 5 and high frequency signal 7 is a double peaked optical spectrum with maxima separated by about 40–50 MHz (FIGS. 2 and 3). In the preferred approach the high frequency signal also phase modulates the output of the laser. A frequency modulated signal can be characterized by an FM index $\beta$, which is the ratio of the amplitude of the frequency modulation to the frequency at which the modulation occurs. In general the number of sidebands created on either side of the carrier frequency increases in proportion to $\beta$. The preferred FM index for the high frequency modulation is in the range of about 1.4–2.5. This phase modulation separates the optical spectrum of the output of laser into spectral lines spaced 6 GHz apart (FIG. 4).

Figure 5:
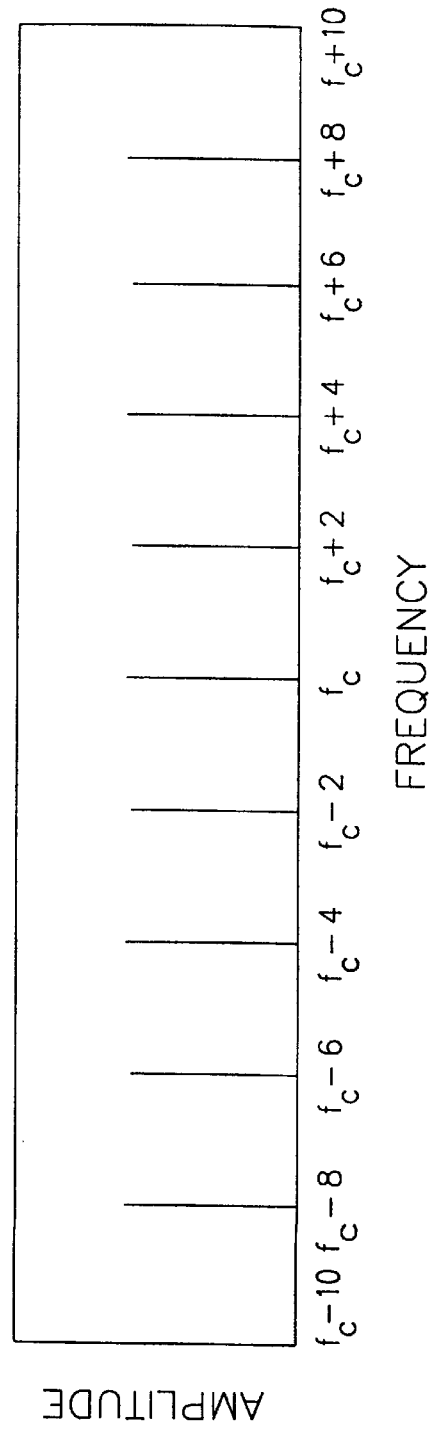
FIG. 5 is a graphical representation of the frequency spectrum of a laser that has been phase modulated at 2 GHz and 6 GHz, each with a FM index of 1.5.

The output of the laser is optically coupled to the input of an external electro-optical phase modulator 8. The phase modulator can be one of a variety of known optical modulators, such as an LiNbO$_3$ modulator. The phase modulator is driven by a third, intermediate frequency signal 9 at a frequency in the order of about 2 GHz, (at least twice the maximum signal frequency being transmitted) for the preferred embodiment. The FM index level $\beta$ is preferably set to about 1.4, or 3.3 or 5.0 as explained hereinafter. The phase modulator separates each of the spectral lines transmitted by the laser into three or more spectral lines spaced about 2 GHz apart (FIG. 5).

The output of the phase modulator 8 is optically coupled to the input port of an amplitude modulator 10. The information carrying signal, CATV in the preferred embodiment, is coupled to the RF input port of the amplitude modulator. The output of the amplitude modulator is coupled to a standard commercially available erbium doped fiber amplifier (EDFA) 11, which launches the signal into an optical fiber. In practice, the presently preferred embodiment modulates the operating wavelength of the laser at a low frequency (preferably 10–100 kHz). A combination of signals is used to directly modulate the source laser. A first low frequency signal 5, typically in the range of 10–100 kHz, directly modulates the drive current of the laser. The low frequency signal has the effect of thermally modulating the laser. That is, the operating temperature of the laser varies, as does the transmitted wavelength, in accordance with the amplitude of the drive source. The magnitude of the low frequency signal is selected so that the spectral broadening is approximately equal to the lowest frequency of the information signal being transmitted, typically 40–50 MHz for CATV.

Through empirical measurements it has been demonstrated that maximum SBS suppression is achieved when the low frequency signal is a low frequency modulation waveform which produces an optical spectrum with two maxima separated by 40–50 MHz. Such a spectrum is obtained by the use of either a sinusoidal wavelength modulation or an electrical signal that results in switching the optical wavelength between two states. Sinusoidal wavelength modulation is attained by applying a sinusoidal signal to the bias direct current that drives the laser. Wavelength switching is approximately attained by applying an alternating series of positive and negative current pulses to the laser. With this series of current pulses as an input, the operating temperature of the laser is more like a square wave response. This results in wavelength hopping when the thermal time constant is long compared to the time between pulses.

FIG. 2 is an approximate indication of the amplitude of the optical spectrum when an alternating series of positive and negative current pulses with zero transition time is used to drive the laser. FIG. 3 is an approximate indication of the amplitude of the optical spectrum when the laser drive current has a non zero transition as with a sinusoidal drive signal. Such a drive signal may result in noticeable side lobes between the two maximums.

In addition, a high frequency signal 7, at a frequency of approximately 6 GHz, that is amplitude modulated at a rate in the range of 10–100 kHz, is injected into the RF port of the laser. The application of this second signal, at a high frequency, achieves two advantageous results. First, application of the high frequency signal heats the active layer of the laser, which in turn results in a wavelength shift. Modulating the RF power of the high frequency signal, modulates the heating of the active layer of the laser, and therefore the wavelength of the laser. This wavelength modulation increases the SBS threshold level.

Although either mode of thermally modulating the laser may be used, it is advantageous to combine the two techniques for modulating the temperature of the laser. The injection of the low frequency signal 5 into the bias port 2 of the laser, heats the laser and the output power of the laser increases as the current is increased. However, when the RF port of the laser is driven with a high frequency signal, the transmitted optical power decreases. In this case, the efficiency of the laser is decreased by the heating of the active layer, resulting in a decrease in the RF power level of the signals launched into the fiber. Thus, through the combination of methods, it is possible to achieve an increase in the SBS threshold level with a corresponding lower level of undesirable change in the output power of the laser than otherwise possible by the use of either method alone.

In addition, high frequency signal 7 and intermediate frequency signal 9 provide dual frequency, narrowband phase modulation of the optical signal. Typically the modulation indices are in the range of about 1.4–5. The lower of these two frequencies is preferably at least twice the maximum signal frequency being transmitted to avoid signal degradation due to fiber dispersion. For CATV transmission, the intermediate signal modulation frequency is typically near 2 GHz.

Advantageously, when an optical signal is phase modulated simultaneously at two frequencies the effective linewidth is substantially increased under two conditions. First, for narrowband phase modulation, -he original signal at $\omega_0$ is converted to a series of spectral lines separated by the modulating frequency. In general, the number of sidebands that appear on either side of the original carrier frequency increases in proportion to the frequency modulation index $\beta$. For an FM index of $\beta=1.4$, there are three equal amplitude spectral lines, which is a particularly useful operating condition. A measure of how efficiently frequency modulation distributes the power among the multiple spectral lines is the ratio of the increase in the SBS threshold to $\beta$. At $\beta=1.4$, this quantity is at a maximum. Although dual modulation at FM indices near 1.4 is a useful operating condition, there are other combinations that may be preferred for some applications.

Second, for CATV transmission wherein the lower of the two modulation frequencies is about 2 GHz, it is beneficial for the two modulation frequencies to have a ratio of approximately three. In the preferred embodiment, the source laser is directly modulated by the higher frequency signal at a frequency of about 6 GHz with an FM index of about 1.4 to 2.5 For example, FIG. 4 shows the frequency domain of the laser output for a phase modulation at 6 GHz and an FM index of 1.5. In this case, the frequency spectrum consists of spectral lines spaced 6 GHz apart. Also, the amplitude of the carrier frequency and the first order side bands are roughly equal. The output of the laser is then externally phase modulated at 2 GHz. Ignoring all but the first side bands, the external phase modulator separates each of the spectral lines spaced 6 GHz apart into three roughly equal amplitude spectral lines spaced 2 GHz apart as shown in FIG. 5.

Thus, a frequency ratio of three assures that no large amplitude spectral lines created by either of the two modulations overlap, thereby providing optimum power distribution across the spectrum. However, it is important that the frequencies not be precisely harmonically related. For the harmonically related case, the sidebands add in amplitude, resulting in nonuniform intensities. For the nearly harmonic case, the closely spaced sidebands are within the SBS linewidth, but for purposes of SBS threshold, the power adds, not the amplitudes so that the SBS threshold is not exceeded.

Figure 6:
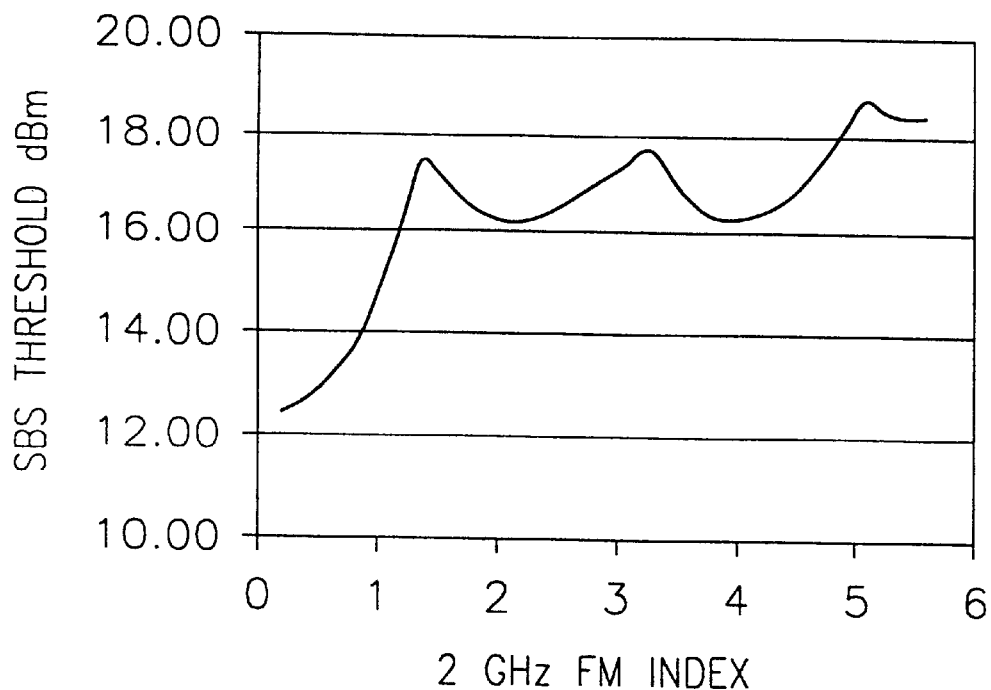
FIG. 6 is a graphical representation of the approximate dependence of the SBS threshold upon the FM index of the external phase modulation at 2 GHz, when the FM index of the direct 6 GHz modulation is fixed at 1.45.

FIG. 6 is an approximate indication of the dependence of the SBS threshold upon the FM index of the external phase modulation at 2 GHz, when the FM index of the direct 6 GHz modulation is fixed at 1.45. The drawing shows that the SBS threshold monotonically increases with increases in the FM index of the 2 GHz modulation, up to an FM index of approximately 1.4. The threshold, decreases slightly for indices greater than 1.4 before attaining a higher maxima at an index of approximately 3.3 and then again at an index of about 5.0. With the 2 GHz modulation fixed at one of the preferred values (i.e $\beta=1.4$, 3.3 or 5.0), the SBS threshold rapidly increases with level of the 6 GHz modulation up to an FM index of 1.4. It then increases more slowly.

Figure 7:
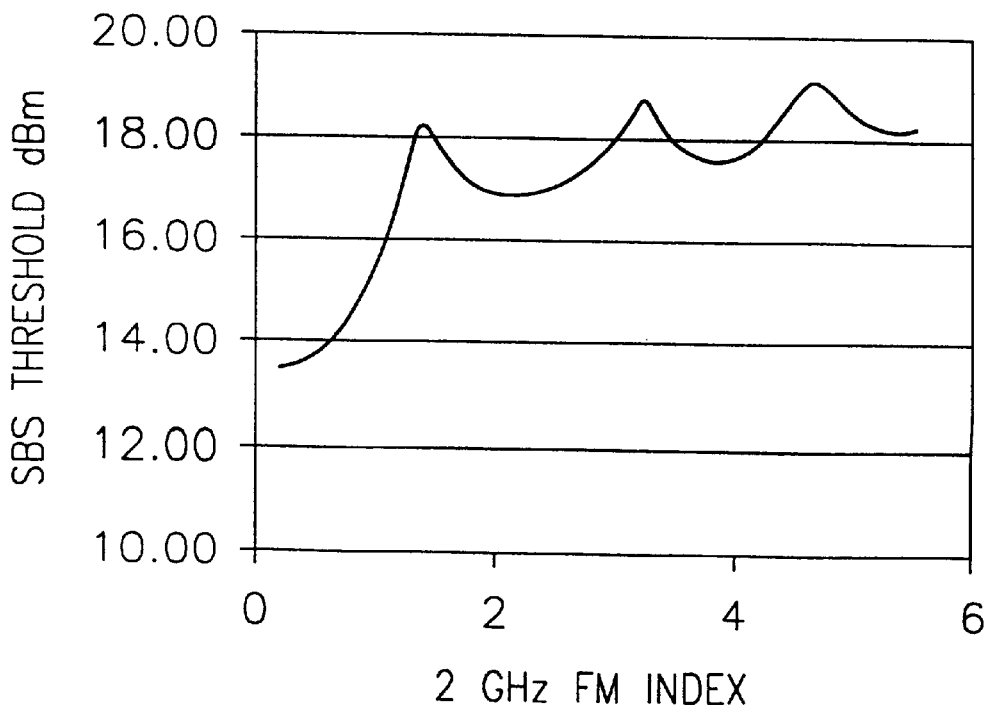
FIG. 7 is a graphical representation of the approximate dependence of the SBS threshold upon the FM index of the external phase modulation at 2 GHz, when the FM index of the direct 6 GHz modulation is fixed at 2.5.

In addition, it is preferable to amplitude modulate either the high frequency signal 7 or intermediate frequency signal 9 to provide effective compensation for second order distortion due to SPM. In practice, the 6 GHz phase modulation with a low frequency signal 5 is more effective at achieving the distortion compensation. Therefore, the 2 GHz modulation is fixed at one of the preferred levels (i.e. $\beta=1.4$, 3.3 or 5.0), and the FM index of 6 GHz modulation is adjusted so as to provide an SBS threshold above the maximum launch power and to have an optimum CSO. The preferred FM index for second order distortion compensation is dependent upon a number of factors including proportions of phase and amplitude modulation, launch power, fiber length, etc., and can be readily found with a few measurements. Typically, the preferred FM index for second order distortion compensation, derived experimentally is in the 2.0–2.5 range. FIG. 7 is an approximate indication of the dependence of the SBS threshold upon the FM index of the external phase modulation at 2 GHz, when the FM index of the direct 6 GHz modulation is fixed at 2.5.

Figure 8:
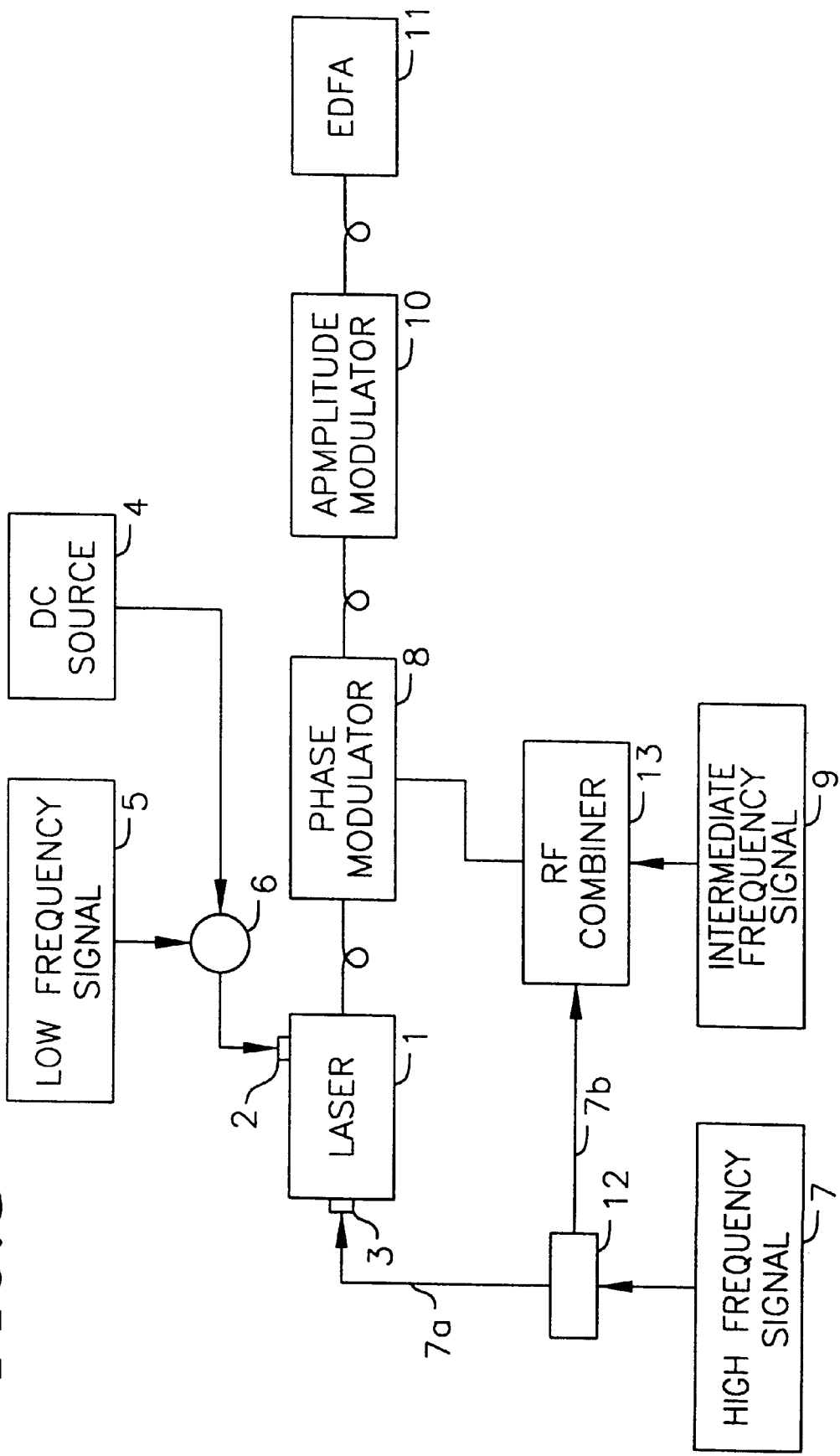
FIG. 8 is a schematic block diagram of an embodiment of an optical transmission system wherein a laser is directly wavelength and amplitude modulated, and externally phase modulated by a signal that is the combination of two signals at different frequencies.

Another schematic block diagram of an optical transmission system is shown in FIG. 8, wherein the three signals are applied in the optical transmission system in slightly different locations. The high frequency signal 7 drives a splitter 12 which divides the signal into two separate signals 7(a) and 7(b). A first signal 7(a) drives the RF port 3 of the laser 1, so as to wavelength and amplitude modulate the laser at a frequency of about 6 GHz. A second signal 7(b) is combined with the intermediate frequency signal 9, at approximately 2 GHz, in a RF combiner 13, and applied to the phase modulator 8. The amplitude and phase of the 6 GHz signal 7(b) utilized for external phase modulation can be controlled independently from the 6 GHz signal 7(a) that directly modulates the DFB source laser. As a result, the amplitude and phase of the second signal 7(b) at about 6 GHz which provides optical phase modulation can be independently adjusted relative to the phase of the first signal 7(a) at about 6 GHz which provides direct amplitude modulation of the laser. That is, when the optical power is at a maximum the frequency need not necessarily be at a maximum. Thus, by including external 6 GHz phase modulation, the angle between the optical amplitude modulation and the phase modulation at 6 GHz can be adjusted to provide for the optimum second order distortion compensation.

Figure 9:
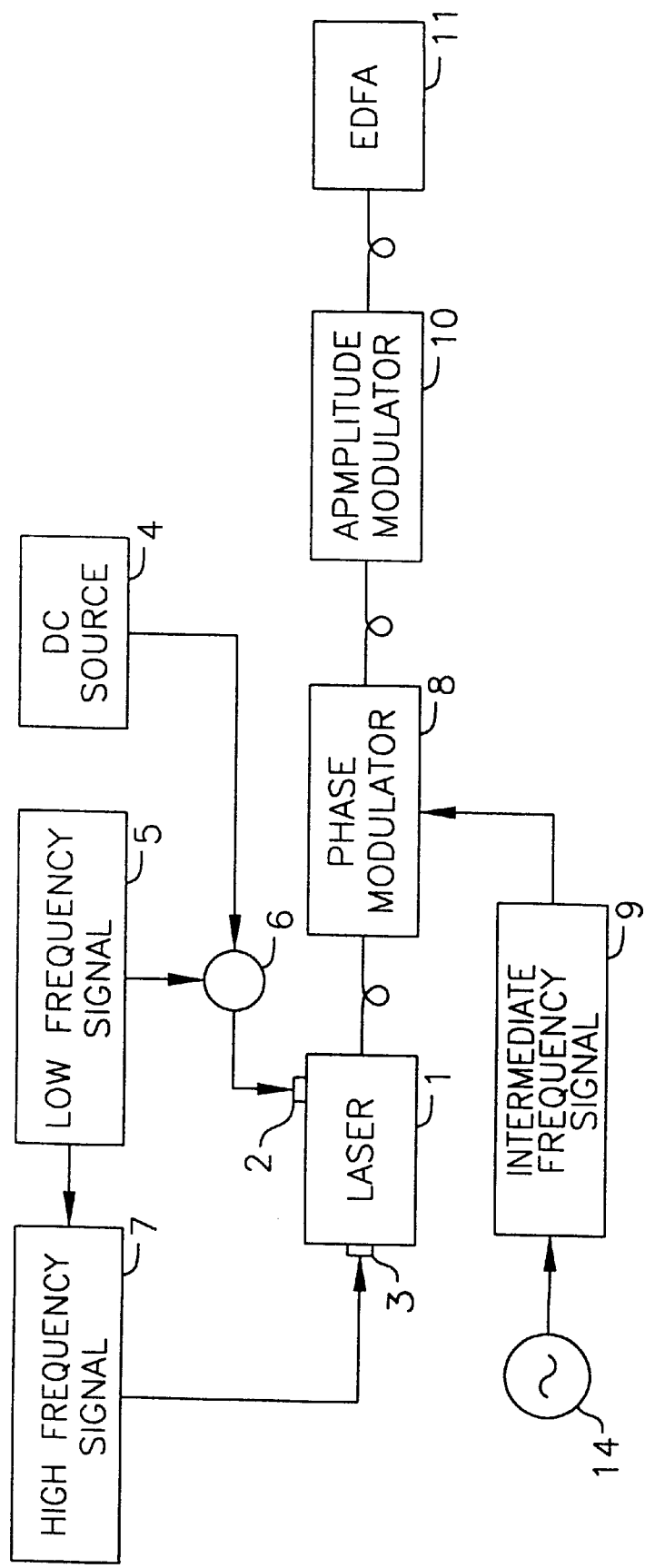
FIG. 9 is a schematic block diagram of an embodiment of optical transmission system wherein a laser is directly modulated, and externally phase modulated with a frequency modulated signal.

A schematic block diagram of a further variation is shown in FIG. 9, wherein the frequency of the intermediate frequency signal 9 that drives the phase modulator 8 is subject to frequency excursions or modulation signals 14. The frequency modulation of the intermediate frequency signal 9 occurs over a narrow frequency range of less than about 1 MHz. Advantageously, modulating the frequency of the intermediate frequency signal 9 reduces the level of intermodulation distortion products related to the phase modulation signal.

Although a preferred embodiment of the present invention has been described, it should not be construed to limit the scope of the appended claims. Those skilled in the art will understand that various modifications may be made to the described embodiment. It is the intention to cover by claims all such uses of the invention and those changes and modifications which could be made to the embodiments herein chosen for the purpose of disclosure without departing from the spirit and scope of the invention.

What is claimed is:

1. An optical transmission system comprising:
    a light source;
    a DC bias source for the light source;
    a low frequency signal source combined with the DC bias source to drive the light source;
    a phase modulator coupled to the output of the light source;
    an intermediate frequency signal source that drives the phase modulator at a frequency which is at least twice the maximum frequency of an information signal being transmitted by the system; and
    a high frequency signal source that modulates an RF port of the light source at a frequency that is approximately three times the frequency of the intermediate frequency signal.

2. The optical transmission system of claim 1 wherein the amplitude of the low frequency signal source is such that the optical spectrum of the light is broadened to a width that is approximately equal to the lowest frequency of an information signal being transmitted by the system.

3. The optical transmission system of claim 1 wherein the low frequency signal source is a sinusoidal waveform.

4. The optical transmission system of claim 1 wherein the low frequency signal source is a pulsed waveform whereby the light source is driven with a series of alternating positive and negative current pulses.

5. The optical transmission system of claim 1 wherein the high frequency signal source is amplitude modulated.

6. The optical transmission system of claim 5 wherein the rate of amplitude modulation is in the range of about 10–100 kHz.

7. The optical transmission system of claim 1 wherein the frequency of the intermediate frequency signal source is modulated.

8. The optical transmission system of claim 7 wherein the range of frequency modulation is less than about 1 MHZ.

9. The optical transmission system of claim 1 further comprising:
    an amplitude modulator driven by an information carrying signal, whose input is coupled to the output of the phase modulator; and
    an EDFA whose input is coupled to the output of the amplitude modulator, and whose output is coupled to an optical fiber.

10. The optical transmission system of claim 1 wherein the frequencies of the high frequency signal source and the intermediate frequency signal source are not harmonically related.

11. The optical transmission system of claim 10 wherein the frequency of the intermediate frequency signal source is about 2 GHz.

12. The optical transmission system of claim 11 wherein the phase modulator has an FM index of about 1.4, 3.3 or 5.0.

13. The optical transmission system of claim 10 wherein the high frequency signal source is at a frequency of about 6 GHz.

14. The optical transmission system of claim 1 wherein the amplitude of the high frequency signal source provides an FM index in the range of about 1.4–2.5.

15. The optical transmission system of claim 1 wherein the high frequency signal source is split into two signals, wherein a first portion of the high frequency signal directly modulates the RF port of the light source and a second portion of the high frequency signal is combined with the intermediate frequency signal to drive the phase modulator.

16. An optical transmission system comprising:
    light generating means for generating light at a predetermined linewidth;
    means for modulating the wavelength of the light generating means, so as to provide a double peaked spectrum that is broadened to a width that is approximately equal to the lowest signal frequency being transmitted by the system;
    phase modulating means for modulating the output of the light generating means at an intermediate frequency which is at least twice the maximum signal frequency being transmitted by the system; and
    means for modulating the light generating means with a high frequency signal at a frequency that is approximately three times the frequency of the intermediate frequency.

17. The optical transmission system of claim 16 wherein the wavelength of the light generating means is modulated at a frequency in the range of about 10–100 kHz.

18. The optical transmission system of claim 16 wherein the high frequency signal is amplitude modulated.

19. The optical transmission system of claim 16 further comprising:
   means for amplitude modulating the output of the phase modulating means in accordance with the information to be transmitted;
   means for coupling the output of the amplitude modulating means into an optical fiber.

20. A method of transmitting an optical signal along an optical fiber at a power level that is above the Stimulated Brillouin Scattering threshold level for the fiber, the method comprising the steps of:
   directly modulating the source of a light beam at a first frequency;
   phase modulating the light beam at a second frequency which is at least twice the maximum signal frequency being transmitted along the optical fiber; and
   directly modulating the source of the light beam at a third frequency which is approximately three times the frequency of the second frequency.

21. The method of claim 20 wherein the step of directly modulating the source of a light beam at a first frequency further comprises directly modulating the source of a light beam at a frequency in the range of about 10–100 kHz.

22. The method of claim 21 comprising directly modulating the operating wavelength of the source of a light beam so as to generate a double peaked optical spectrum, wherein each peak of the optical spectrum has been broadened to a width that is approximately equal to the lowest signal frequency being transmitted.

23. The method of claim 20 further comprising the steps of:
   amplitude modulating the phase modulated signal in accordance with the information to be transmitted; and
   coupling the amplified light beam to an optical fiber.

24. The method of claim 20 comprising the step of amplitude modulating the third signal at a rate in the range of about 10–100 kHz.

25. The method of claim 20 further comprising the step of modulating the second frequency with frequency excursions of less than about 1 MHz.

26. The method of claim 20 comprising second and third frequencies that are not harmonically related.

27. The method of claim 26 wherein the step of phase modulating the light beam at a second frequency further comprises phase modulating the light beam at a second frequency of about 2 GHz.

28. The method of claim 27 comprising phase modulating the light beam at a second frequency with a FM index of about 1.4, 3.3 or 5.0.

29. The method of claim 26 wherein the step of directly modulating the source of the light beam at a third frequency further comprises directly modulating the source of the light beam at a frequency of about 6 GHz.

30. An optical transmission system comprising:
   a light source whose wavelength is modulated to broaden the optical spectral width of the output of the light source;
   a phase modulator coupled to the output of the light source;
   an intermediate frequency signal source that drives the phase modulator at a frequency which is at least twice the maximum signal frequency being transmitted by the system; and
   a high frequency signal source that directly modulates the light source at a frequency that is approximately three times the frequency of the intermediate frequency signal.

31. The optical transmission system of claim 30 wherein the optical spectral width of the output of the light source is approximately equal to the lowest signal frequency being transmitted by the system.

32. The optical transmission system of claim 30 wherein the wavelength of the light source is modulated by a low frequency signal source applied directly to the light source.

33. The optical transmission system of claim 32 wherein the frequency of the low frequency signal source is in the range of about 10–100 kHz such that the light source transmits a light beam comprising two peaks separated by about the lowest signal frequency being transmitted by the system.

34. The optical transmission system of claim 30 wherein the high frequency signal source that directly modulates the light source is amplitude modulated.

35. The optical transmission system of claim 34 wherein the rate of amplitude modulation is in the range of about 10–100 kHz.

36. The optical transmission system of claim 30 wherein the frequencies of the high frequency signal source and the intermediate frequency signal source are not harmonically related.

37. The optical transmission system of claim 36 wherein the frequency of the intermediate frequency signal source is about 2 GHz.

38. The optical transmission system of claim 37 wherein the phase modulator has an FM index of about 1.4, 3.3 or 5.0.

39. The optical transmission system of claim 37 wherein the high frequency signal source is at a frequency of about 6 GHz.

* * * * *